Figure 1:
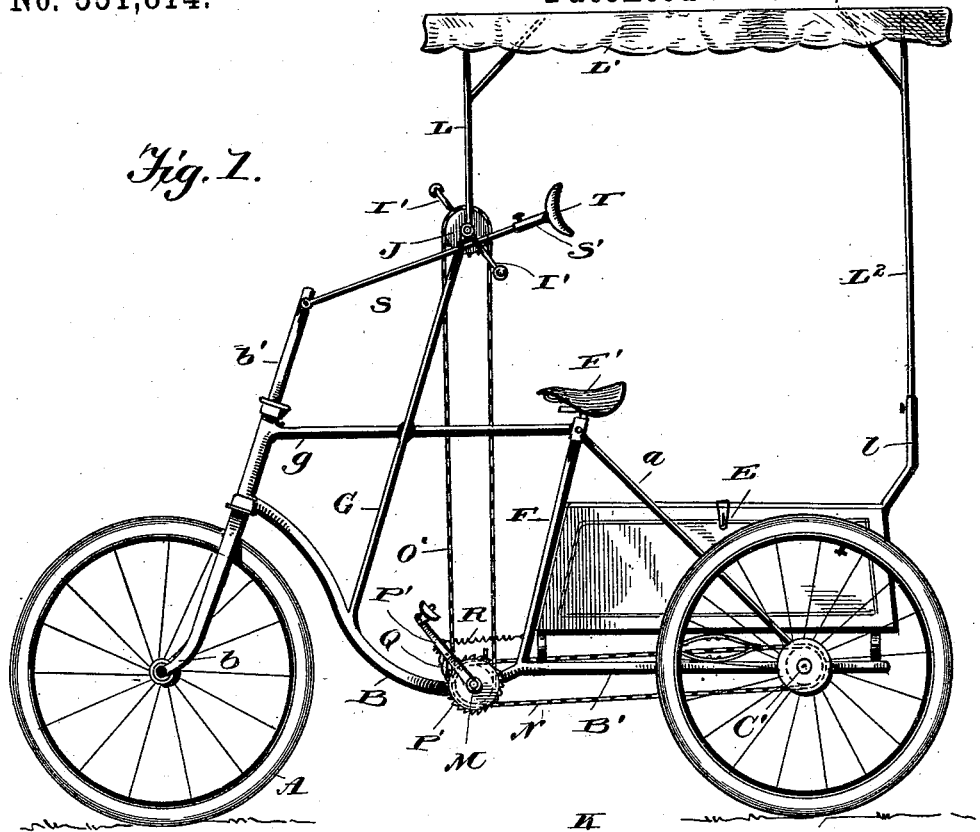

(No Model.)

J. R. EAST.
MAN MOTOR.

No. 551,814.   Patented Dec. 24, 1895.

Witnesses:
L. C. Hills.
A. L. Hough

Inventor:
Joseph R. East,
by Franklin H. Hough
Atty.

UNITED STATES PATENT OFFICE.

JOSEPH RICHARD EAST, OF FINCASTLE, TENNESSEE.

MAN-MOTOR.

SPECIFICATION forming part of Letters Patent No. 551,814, dated December 24, 1895.

Application filed March 7, 1895. Serial No. 540,917. (No model.)

*To all whom it may concern:*

Be it known that I, JOSEPH RICHARD EAST, a citizen of the United States, residing at Fincastle, county of Campbell, and State of Tennessee, have invented a new and useful Man-Motor, of which the following is a specification.

This invention relates to certain new and useful improvements in vehicles of that class designed to be propelled by hand or foot power or both, and it has for its objects among others to provide a simple and light device of this character adapted for the carrying of freight and the like, or more than the rider, and also to provide means whereby the operator may easily guide the vehicle by the movements of his shoulders when both his hands and feet are engaged in the propulsion of the vehicle. The steering mechanism is adjustable to accommodate the height of the rider.

Other objects and advantages of the invention will hereinafter appear, and the novel features thereof will be specifically defined by the appended claims.

The invention in this instance resides in the peculiar combinations, and the construction, arrangement, and adaptation of parts, all as more fully hereinafter described, shown in the drawings, and then particularly pointed out in the claims.

The invention is clearly illustrated in the accompanying drawings, which, with the letters of reference marked thereon, form a part of this specification, and in which—

Figure 2:
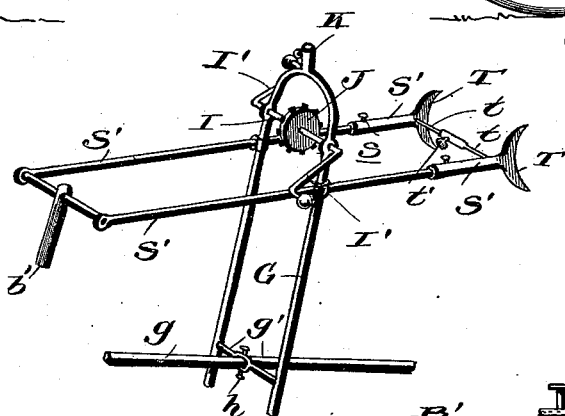
Figure 3:
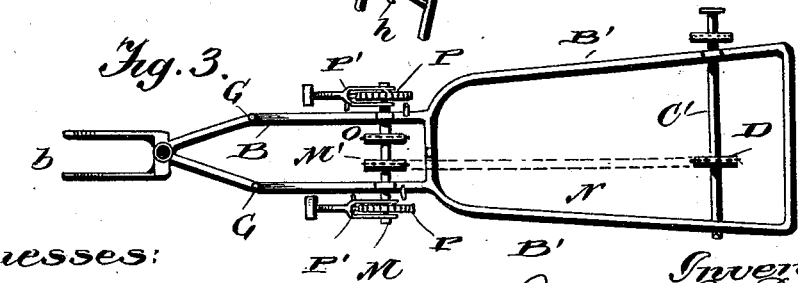

Figure 1 is a side elevation of my improved vehicle. Fig. 2 is a perspective detail showing the arched support for the hand-propelling means and the guiding mechanism. Fig. 3 is a plan of the frame with the wheels, saddle, bed, and other parts removed.

Like letters of reference indicate like parts throughout the several views.

Referring now to the details of the drawings by letters, A designates the front wheel, the axle of which is supported in the usual manner in the fork $b$ of the frame B. The rear wheels C are carried by the axle C', which is supported in the side bars B' of the frame, as seen in Fig. 3, and upon this rear axle is the sprocket-wheel D. The body or box E is supported preferably upon springs, as seen in Fig. 1, which are supported by the rear portion of the frame B. This frame B has the saddle-post F for the saddle F' of any well-known style and supported in position in any suitable manner. Suitable braces $a$ may be employed, as seen in Fig. 1.

G is an arched support rising from the frame B at a point between the saddle-post and the form, and the horizontal rod $g$ of the frame connecting the saddle-post and fork passes through an opening $h$ in the cross-brace bar $g'$ of this support, as seen best in Fig. 2, while near its upper end this support has bearings for a horizontal shaft I, the ends of which are extended and are provided with crank-handles I', while fast upon this shaft between the side bars of this support is a sprocket-wheel J, as seen best in Fig. 2. Extending from the center of the arch of this support is a socket-piece K, provided with a thumb-screw or analogous means, as seen in Fig. 2, for the reception of the supporting-bar L of a canopy-top L', the other supporting-bars $L^2$ of which are supported in similar sockets $l$ on the body or box E, as seen in Fig. 1.

M is a cross-shaft suitably journaled in the side bars of the frame B, as seen best in Fig. 3, and on this shaft between the said side bars is a sprocket-wheel M', over which and over the sprocket-wheel D on the shaft C' passes the sprocket-chain N, as indicated by full lines in Fig. 1 and dotted lines in Fig. 3. On this shaft is also a sprocket-wheel O, over which and the sprocket-wheel J on the shaft I passes a sprocket-chain O', as seen best in Fig. 1. Fast on this shaft M near each end is a ratchet-wheel P, while pivoted on the axle are the foot-levers P', carrying pedals or treadles of known construction and carrying also the pawls Q, pivotally mounted thereon and adapted to engage the ratchet-wheels in the well-known manner. The foot-levers are provided with springs R for the purpose of bringing them back to their normal position after their downstroke.

S are longitudinally-disposed rods having their front ends pivotally connected with the upper end of the steering-rod $b'$, and to their rear ends are adjustably fitted in any suitable manner—for instance, as seen in Fig. 2— the short tubular bars S', into which the rods S fit and where they are held by the thumb-screws $s$. The rods S' each carry the yoke T, which is fitted to the points of the shoulders of the rider, and these yokes are adjustably and detachably connected, as seen in Fig. 2, by means of the rods $t$ and set-screw $t'$, similar to the manner of connecting the rods S and S'.

With the parts constructed and arranged substantially as above set forth the operation will be readily understood, and, briefly stated, is as follows: The vehicle is propelled by the hands by the turning of the hand-cranks I', which gives motion to the sprocket-wheel J, chain O', wheel O, shaft M, and through the medium of the sprocket-wheels M' and D and chain N the vehicle is propelled. The vehicle is propelled by the feet by pressure downward upon the foot-levers in the usual manner. The device may be propelled by either hand or feet or both mechanisms may be operated together. The vehicle is guided by the shoulder of the rider, against which fit the yokes T, which can be readily adjusted to properly fit the shoulders and thus the machine may be guided while the feet and hands are engaged in the propulsion of the same.

The device is simple, light, easily operated and guided, and in practice has proven very efficient and durable.

What I claim as new is—

1. The combination with the frame and the hand and foot propelling mechanisms, of rods pivoted to the steering rod, and yokes adjustably mounted on said rods for guiding the machine by the movements of the shoulders of the rider, rods extending inwardly from the side bars of said yokes, one being adjustable within the other and a set screw for holding them in their adjusted position.

2. The combination with the frame and the hand and foot propelling mechanisms, of the rod pivoted to the steering rod, the yokes, the rods carried by said yokes and telescopingly connected, and a set screw for holding the same in their adjusted positions, substantially as described.

JOSEPH RICHARD EAST.

Witnesses:
F. D. CANON,
A. C. KINCAID.